United States Patent
Factor

[19]
[11] Patent Number: 5,963,757
[45] Date of Patent: Oct. 5, 1999

[54] SYSTEM FOR PROCESSING A PHOTOSENSITIVE MATERIAL

[75] Inventor: Ronda Ellen Factor, Rochester, N.Y.

[73] Assignee: Eastman Kodak Company, Rochester, N.Y.

[21] Appl. No.: 08/625,623

[22] Filed: Mar. 29, 1996

[51] Int. Cl.[6] .............................. G03B 27/52; G03B 27/80
[52] U.S. Cl. ................................ 399/40; 399/38; 399/39; 399/41; 399/42; 399/43
[58] Field of Search .................................. 355/67, 77, 38, 355/39, 40, 41, 42, 43

[56] References Cited

U.S. PATENT DOCUMENTS

| | | |
|---|---|---|
| 3,149,529 | 9/1964 | Critchlow . |
| 3,375,744 | 4/1968 | Schieven . |
| 3,495,782 | 2/1970 | Nelson et al. . |
| 3,723,122 | 3/1973 | Yano et al. . |
| 4,841,340 | 6/1989 | Tokuda . |
| 4,896,186 | 1/1990 | Tokuda . |
| 4,951,086 | 8/1990 | Hicks ........................................ 355/41 |
| 5,160,952 | 11/1992 | Iwashita et al. . |
| 5,281,993 | 1/1994 | Crochetierre et al. .................... 355/40 |
| 5,432,586 | 7/1995 | Tokuda ..................................... 355/41 |

FOREIGN PATENT DOCUMENTS 91-223741  11/1991  Japan .

*Primary Examiner*—Richard Moses
*Assistant Examiner*—Shival Virmani
*Attorney, Agent, or Firm*—Frank Pincelli

[57] ABSTRACT

A method and apparatus for locating and cutting individual images from a web containing a plurality of images, the web having a magnetic media capable of retaining magnetically recorded data. The apparatus comprising a reader for reading magnetically recorded data contained on the magnetic media which provides information relating to the location of the images thereon; and a mechanism responsive to the information read by the reader and for performing an operation to the web in accordance with the information.

18 Claims, 10 Drawing Sheets

SYSTEM FOR PROCESSING A PHOTOSENSITIVE MATERIAL

FIELD OF THE INVENTION

The present invention relates to photofinishing and, more particularly, to a method and system for processing photosensitive material.

BACKGROUND OF THE INVENTION

In typical high speed photofinishing systems, a plurality of individual film orders are spliced together and passed through a photographic printer wherein images are serially printed onto a web of photographic paper. The web of photographic paper is then wound onto a large roll and is taken to a chemical processor where the exposed web of photographic paper is developed. Thereafter, the web of paper is further processed by separating the individual images into customer orders and collating them with the original strip of negative film that was used to print the images. During the printing process, perforation marks are made in the paper and are used to identify the location of individual images. Typically, a notch is placed between adjacent images. A second perforation/notch is placed between successive customer orders, thus allowing for easy identification between successive customer orders. The current notching process causes many difficulties. First, with regard to the printer, the multitude of notches/perforations that are formed in the photographic paper creates a lot of dust within the printer which tends to make parts wear quicker and can also substantially effect the overall quality of the images being printed. Additionally, since perforations are used both to distinguish between individual images and successive customer orders, perforations are placed on both edges of the photographic paper. Thus, it is necessary to provide an appropriate mechanism for repositioning of the notching mechanism to accommodate various size papers within the printer.

Current photographic printers today have also been limited with respect to the amount of information that can be placed on the print. Often, print program information or information read from the negative film is visually imprinted onto the print, for example, the date, customer order, name, etc. Typically, it has been not possible to provide information such as exposure settings used to make the print, or providing instructional information as to what should be done to the photographic paper at some later photofinishing processing section or station.

Applicants have invented an improved method and system which overcomes the problems of the prior art.

Briefly, the present invention provides a method and apparatus which includes providing a photographic paper having a magnetic recording media upon which magnetically encoded information may be written which can provide processing information, for example, information relating to the size, type, and location of the image for each customer order. Additional information can also be provided with respect to other operations to be performed on the web, additional customer information regarding the images, or information regarding how the print was formed, for example, print exposure information. A magnetic recording head is provided in the printer at a predetermined position after the image has been printed on a photographic web. Information can be written onto the magnetic media provided on the web, which is later read by an appropriate reader and used to cut the individual images from the web, or perform some other operation thereon. In addition, as previously discussed, the write head can provide information relating to the print exposure or other information.

SUMMARY OF THE INVENTION

In accordance with one aspect of the present invention, there is provided an apparatus for locating and cutting individual images from a web containing a plurality of images, the web having a magnetic media capable of retaining magnetically recorded data; the apparatus comprising a reader for reading magnetically recorded data contained on the magnetic media which provides information relating to the location of the images thereon; and a mechanism responsive to the information read by the reader and for performing an operation to the web in accordance with the information.

In accordance with another aspect of the present invention there is provided a method for separating individual images from a web containing a plurality of images, comprising the steps of:

a) providing a web of photosensitive material having a plurality of images formed thereon, the web having a magnetic media containing information relating to the location of the individual images for allowing the individual images to be cut from the web;

b) reading the information contained on the web; and c) cutting the individual images from the web in accordance with the information.

These and other advantages of the present invention will be more clearly understood and appreciated from a review of the following detailed description and appended claims, and by reference to the accompanying drawings.

DETAILED DESCRIPTION OF THE INVENTION

Figure 1:
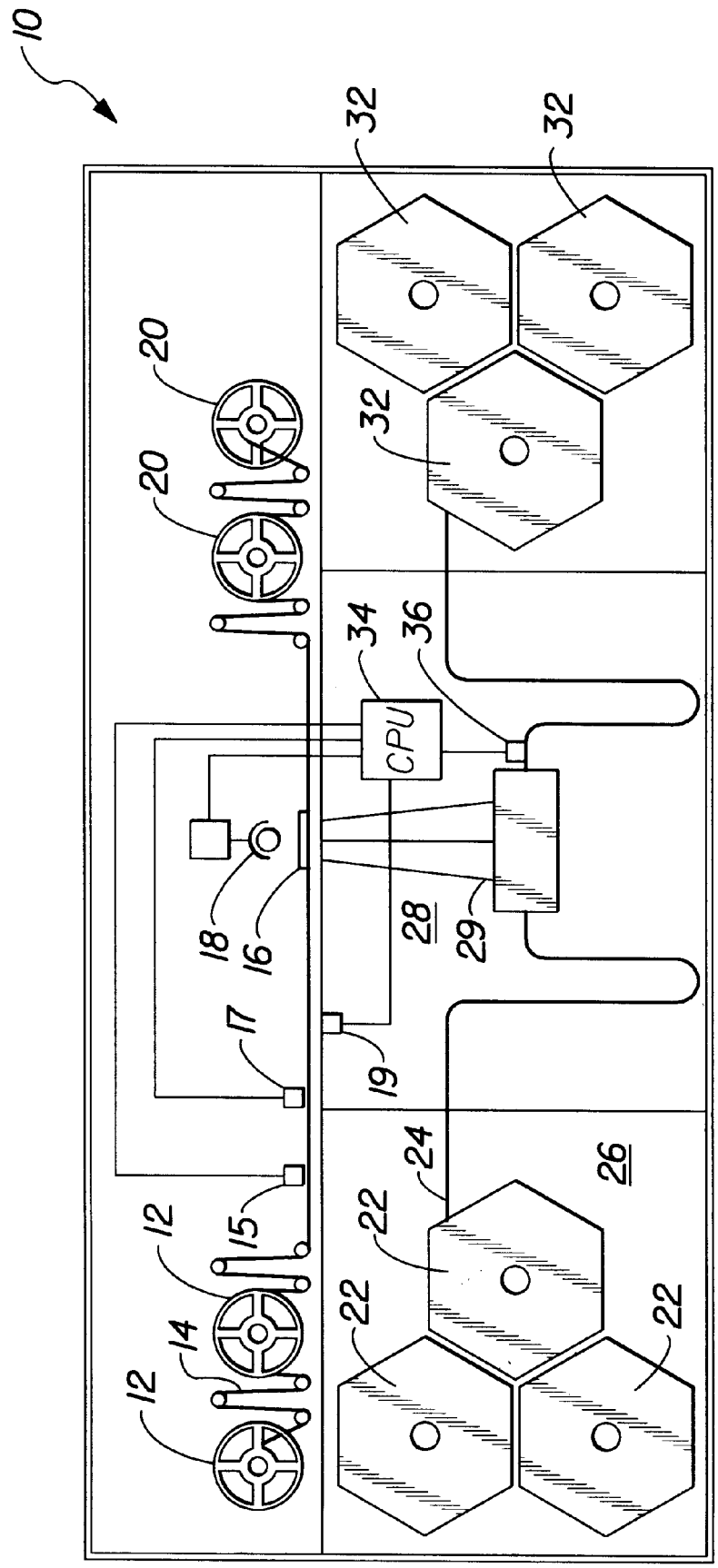
FIG. 1 is a schematic view of a prior art photographic printer.

Referring to FIG. 1, there is illustrated schematically a photographic printer according to the prior art. An example of such a printer 10 is the Kodak Clas printer which produces prints at the rate of approximately 7 images per second. The printer 10 includes a pair of supply reels 12 each capable of receiving a web of developed negative film 14. The film 14 comprises a plurality of individual strips of negative film that have been developed and spliced together to form a long continuous roll, each strip being representative of a single customer order. Typically a splice tape (not shown) is used to connect adjacent customer orders which generally contains customer identification order information. The printer also has various sensors 15,17 for scanning the film and splice tape. In the embodiment illustrated, the sensor 15 is a CCD (charged coupled device) array for scanning the developed image on the film and the information obtained is typically used to provide exposure control information. The sensor 17 may be used to read information that is present on the splice on the film. There has been recently suggested that the film may have a thin transparent magnetic layer on the side of the film opposite the emulsion side where information can be magnetically written. Information may include printing information supplied by the customer and/or film manufacturer. In order to read this information, a magnetic read head 19 is provided. The film 14 is driven past a film print gate 16 whereby a light source 18 is used to successively expose individual images on the negative film 14. Thereafter, the film is fed onto one of the take-up reels 20. As one of the supply reels 12 is emptied, a second supply reel 12 would be placed on the printer and fed onto a empty take-up reel 20.

The printer 10 includes a plurality of supply magazines 22, each containing a reel having a continuous web of photosensitive material 24 wound therein. In the present invention illustrated, the photographic material comprises photographic paper. In the embodiment illustrated there are three supply magazines 22 so that when the reel located at the delivery position is emptied, the next full magazine in line can be quickly shifted to the delivery position so as to maintain productivity. The photosensitive material 24 passes from the magazine supply area 26 to the printing section 28 having printing area 29 wherein images on the negative film 14 are exposed onto the photographic paper 24. After exposure, the photosensitive material 24 is passed onto a take-up area and wound onto a take-up reel provided in take-up magazine 32. In the particular embodiment illustrated, a plurality of take-up magazines 32 are also provided so that a fully loaded take-up magazine 32 can be removed while an empty take-up magazine is put into position for receipt of exposed paper. The printer 10 further includes a microprocessor 34 which is used to control operation of the entire printer 10, including the intensity of the light 18. The microprocessor 34 is connected to sensors 15,17 and read head 19 which uses the information obtained for controlling operation of the printer. The microprocessor 34 is also connected to a perforation device 36 which is used to provide perforations in the web for indicating the location of individual images and differentiating between successive customer orders.

Figure 2:
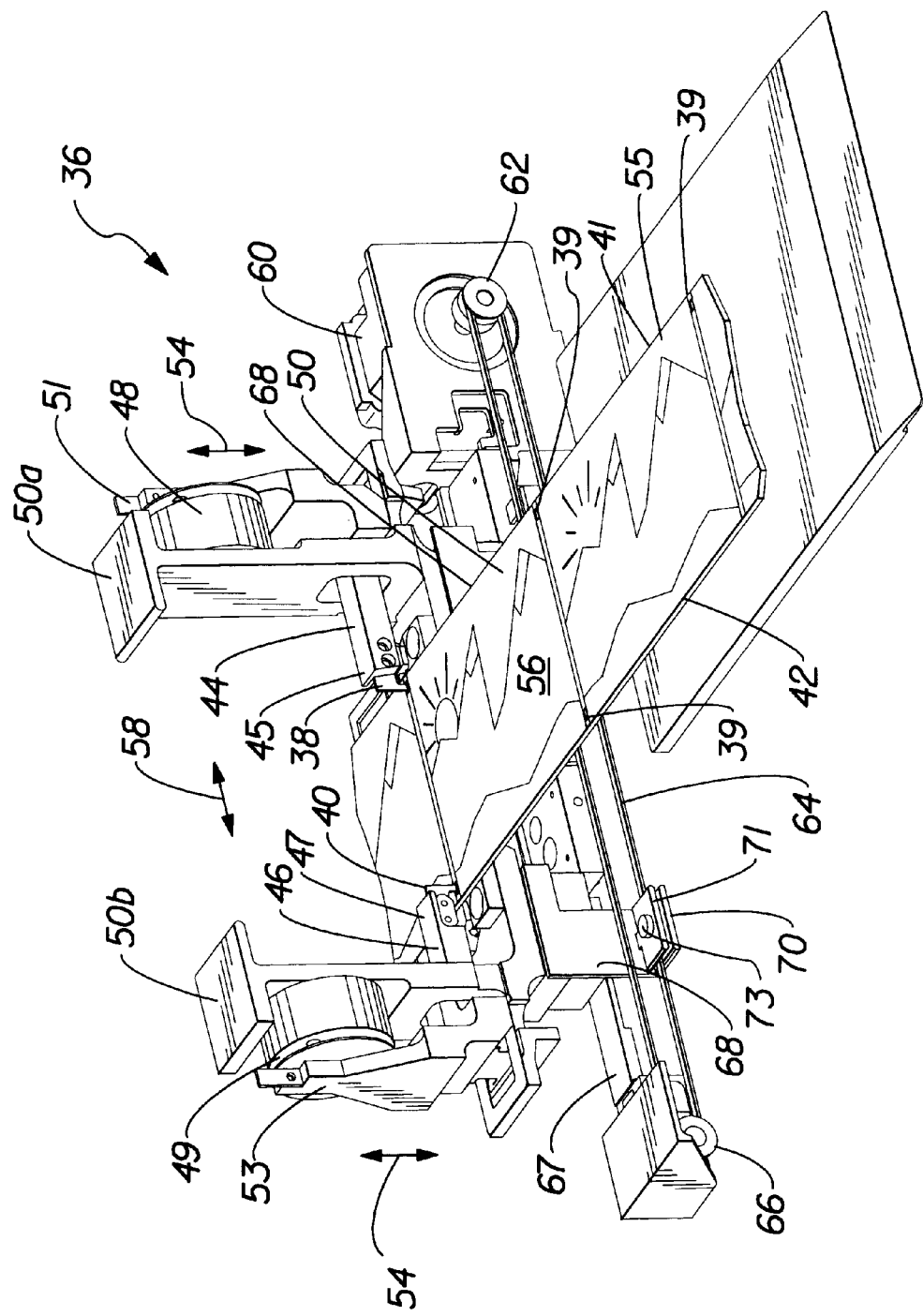
FIG. 2 is an enlarged perspective view of a portion of the printer of FIG. 1 illustrating the notching mechanism used to provide notches on the photosensitive web for identifying the position of individual images printed thereon and for differentiating between customer orders.

Referring to FIG. 2, there is illustrated a perspective view of the perforation mechanism 36 provided in printer 10. The perforation mechanism 36 includes a pair of perforation-forming heads 38,40 which are used to make perforations/notches 39 in the photographic paper 24 and are positioned closely adjacent the longitudinal edges 41,42. The heads 38,40 are secured to the substantially L-shaped support members 44,46, respectively. In particular, the perforation-forming head 38 is connected to the end 45 of member 44 and perforation-forming head 40 is connected to the end 47 of member 46. A pair of drive motors 48,49 are mounted to frame members 50a,50b of mechanism 36. The drive motors 48,49 are secured to the upper end 51,53 of substantial L-shaped members 44,46, respectively, such that when the motors 48,49 are properly activated it causes the L-shaped members 44,46 to move in a substantially perpendicular direction as indicated by arrows 54 moving the heads 38,40 in a substantially perpendicular direction with respect to web 24 so as to provide a perforation/notch 39 adjacent either edge 41 or edge 42. In the particular embodiment illustrated, the head 38 is designed to provide a notch between adjacent images 55,56, whereas perforation-forming head 40 produces a perforation/notch 39 between adjacent customer orders.

The perforation mechanism 36 further includes a mechanism for moving frame members 50a,50b in a direction either toward or away from each other as indicated by arrow 58, thus allowing positioning of perforation-forming head 38,40 adjacent the appropriate edges 41,42 of various size photosensitive papers that can be accommodated in printer 10. In the particular embodiment illustrated, this is accomplished by a pulley system comprising a motor 60 having a drive pulley 62 around which a drive belt 64 is placed and an idler pulley 66, spaced from pulley 62 and secured to the frame 67 of perforation mechanism 36. The belt 64 is secured to each of the mounting members 50a,50b by a connecting member 68 having one end secured to the belt 64 and the other end secured to the associated mounting member 50a or 50b. In the particular embodiment illustrated, only one of the connecting members 68 is clearly illustrated. The lower end of each member 68 is secured to belt 64 by any desired manner. In the particular embodiment illustrated, the connecting member 68 is secured by a screw 73 which clamps the belt between two plate members 70,71. The motors 60 and 49 are appropriately connected to CPU 34 and are activated as appropriate. Thus, appropriate perforations may be on the web of photosensitive material as desired.

Figure 3:
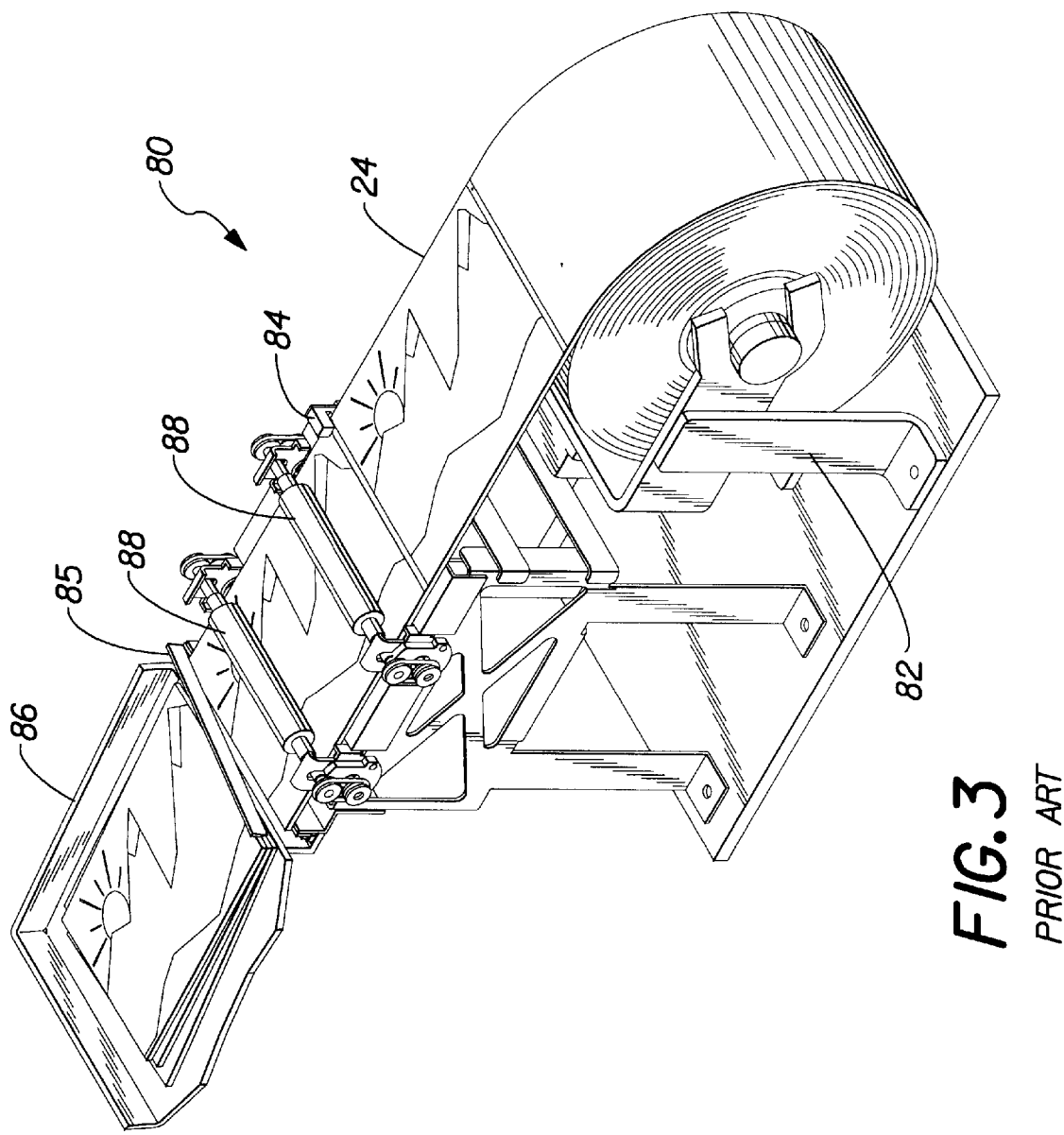
FIG. 3 is a perspective view of a prior art cutting station wherein individual images that have been developed on the photographic paper are cut from individual rolls produced by the device of FIGS. 1 and 2.

Once the material 24 has been fully exposed, the magazine 32 is taken to a typical photographic paper processor where the images on the web of photosensitive material are developed. After the web of material 24 has been fully developed, it is then taken to a cutting station where the individual images are cut from the web and matched with the negative film 14 that produced the images. Referring to FIG. 3, there is illustrated a typical prior art cutting station 80, which includes a frame 82 for holding a developed roll of photosensitive material 24 that has been fully developed. The cutting station 80 also includes a sensor 84 for detecting the perforations formed by the perforation mechanism 36 in the printer and a guillotine knife 85 for cutting of the web so as to separate individual images. The cutting station also includes a receiving tray 86 for holding individual cut prints. Sensor 84 is disposes at a predetermined location with respect to the guillotine knife 85 so that when a perforation is detected, the cutting knife is activated. Appropriate rollers 88 are provided for transporting and moving of the web along the cutting station.

Figure 4:
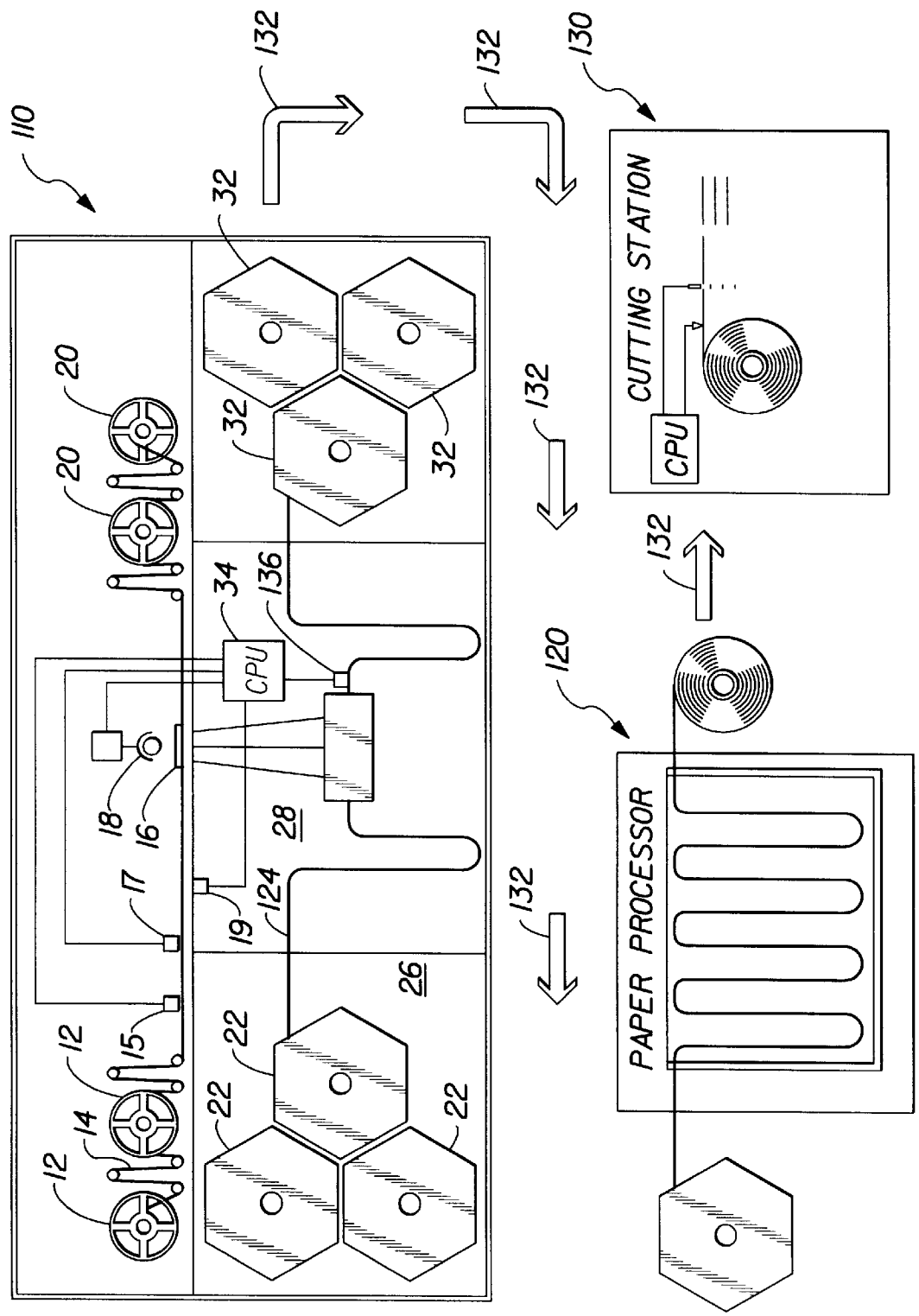
FIG. 4 is a schematic view of a photographic processing system made in accordance with the present invention which includes a photographic printer, a photographic paper processor, and a cutting station.
Figure 5:
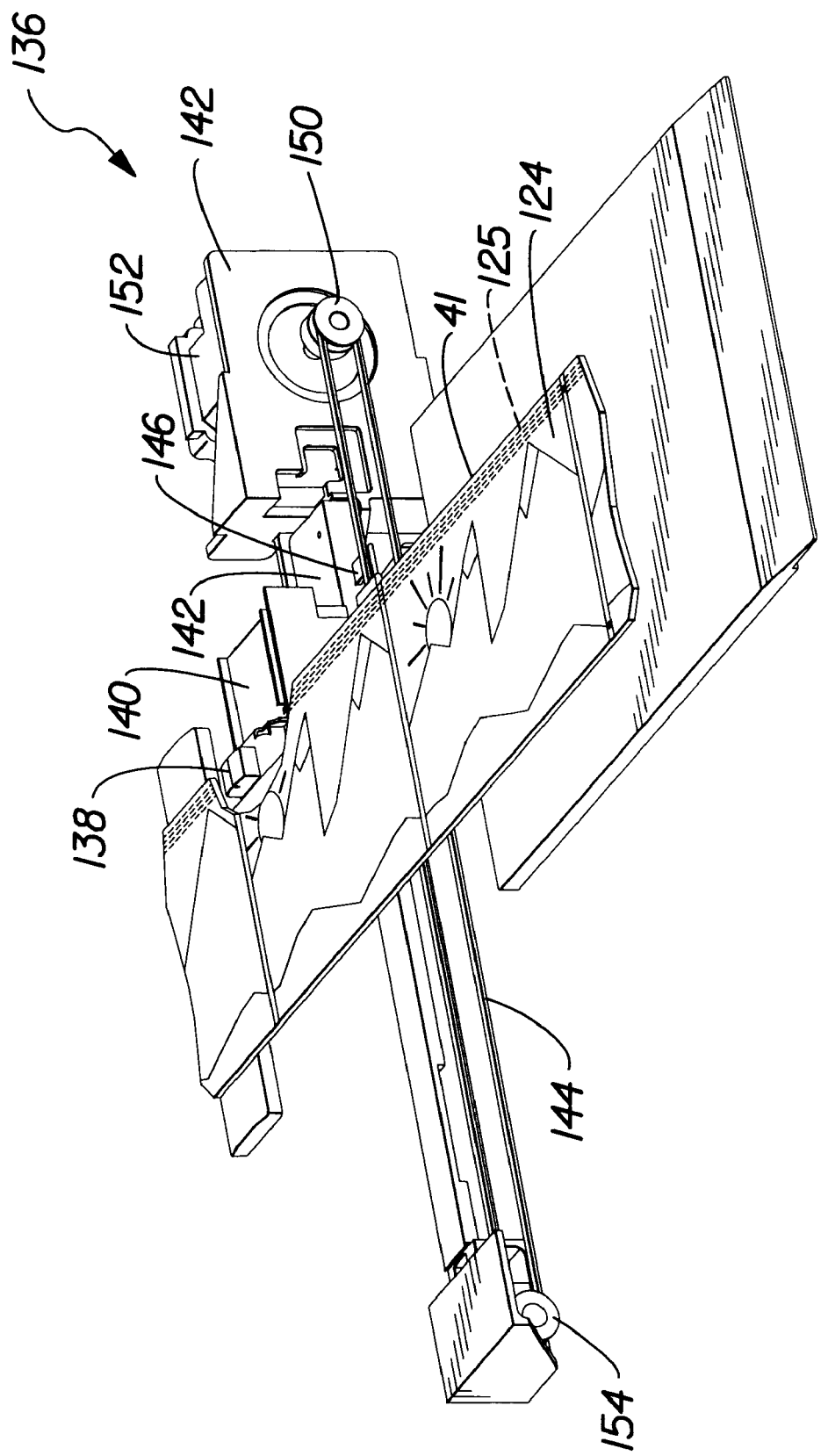
FIG. 5 is a perspective view of a portion of the printing apparatus of FIG. 4 illustrating the mechanism used to provide informational data on the photographic material upon which printing occurs.
Figure 6:
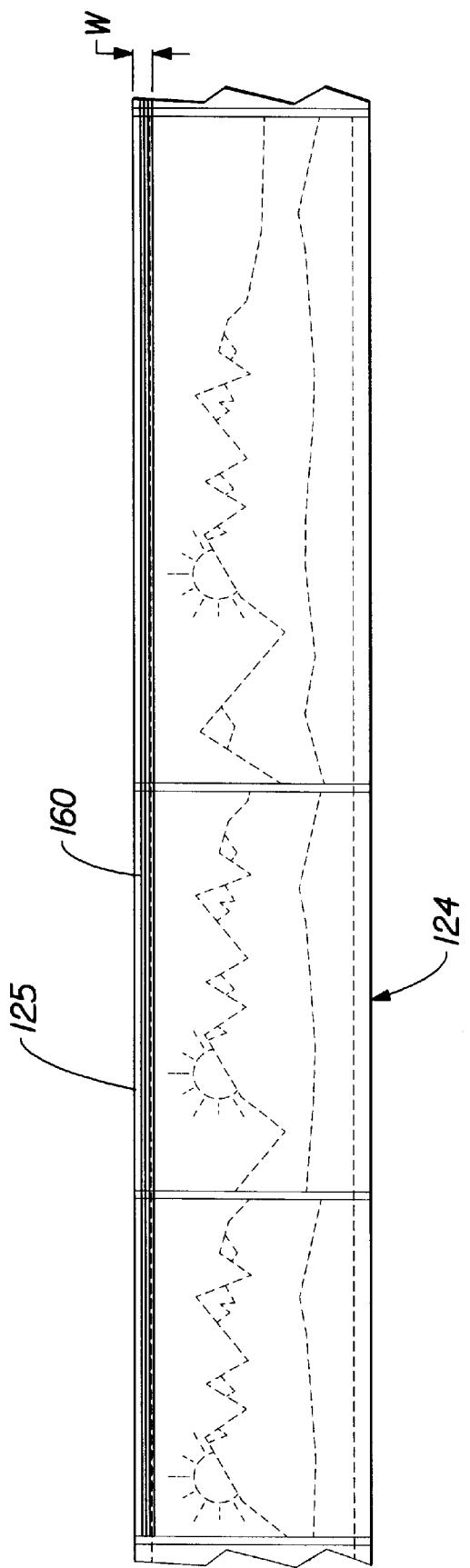
FIG. 6 is a plan view of the back side of photographic material illustrated in FIG. 5.

Referring to FIG. 4, there is illustrated a photographic processing system made in accordance with the present invention. In particular, the photographic printing system includes a printer 110 which is similar to photographic printer 10, like numerals indicating like parts and operation. The photographic processing system also includes a paper processor 120 and a cutting station 130. The arrows 132 indicate the direction of flow of the photosensitive material through the system. Instead of having a perforation mechanism 36, as illustrated in the printer 10 of FIG. 1, the printer 110 includes a magnetic writing mechanism 136 for magnetically writing onto a magnetic media that has been provided on a photographic web 124. Referring to FIGS. 4 and 5, there is illustrated in greater detail a magnetic writing mechanism. The mechanism 136 includes a magnetic write head 138 which is secured to a mounting block 140, which is slideably mounted to frame 142. Block 140 is slid along frame 142 by a belt 144 secured to a connecting member 146 having one end secured to the mounting block 140 and the other end secured to the belt by any appropriate fastening means. The belt 144 is wrapped around a drive pulley 150 which is secured to the shaft of motor 152. The motor 152 is also mounted to frame 142. The belt 144 is also wrapped around an idler pulley 154 such that the magnetic write head 138 may be moved so that it is positioned adjacent the edge 41 of the photosensitive web 124. As previously discussed, photosensitive web 124 is provided with a magnetic media 125 upon which information can be magnetically recorded, as best illustrated by FIG. 6. In the particular embodiment illustrated, magnetic media 125 comprises a strip 160 of magnetic material having a width W, which extends continuously along the length of the web. The amount and thickness of the strip 160 may be selected as desired so long as it is capable of retaining magnetic information recorded thereon. While in the particular embodiment illustrated the strip 160 is continuous, it may be intermittent, or placed along the entire back surface of the photosensitive material. In the embodiment illustrated, the magnetic strip 160 is placed on the side of the photosensitive material opposite the emulsion side. However, if desired, the photographic paper may be made such that the magnetic media is placed on the same side as the emulsion, for example, along an extended edge area as illustrated in FIG. 6, or possibly a transparent magnetic layer over the image area. The present invention is not limited to a particular construction. It is only necessary that appropriate magnetic media 125 be placed on the photosensitive material 24 such that there is a sufficient amount of magnetic media present so that appropriate instructions can be written and/or read therefrom.

Figure 7:
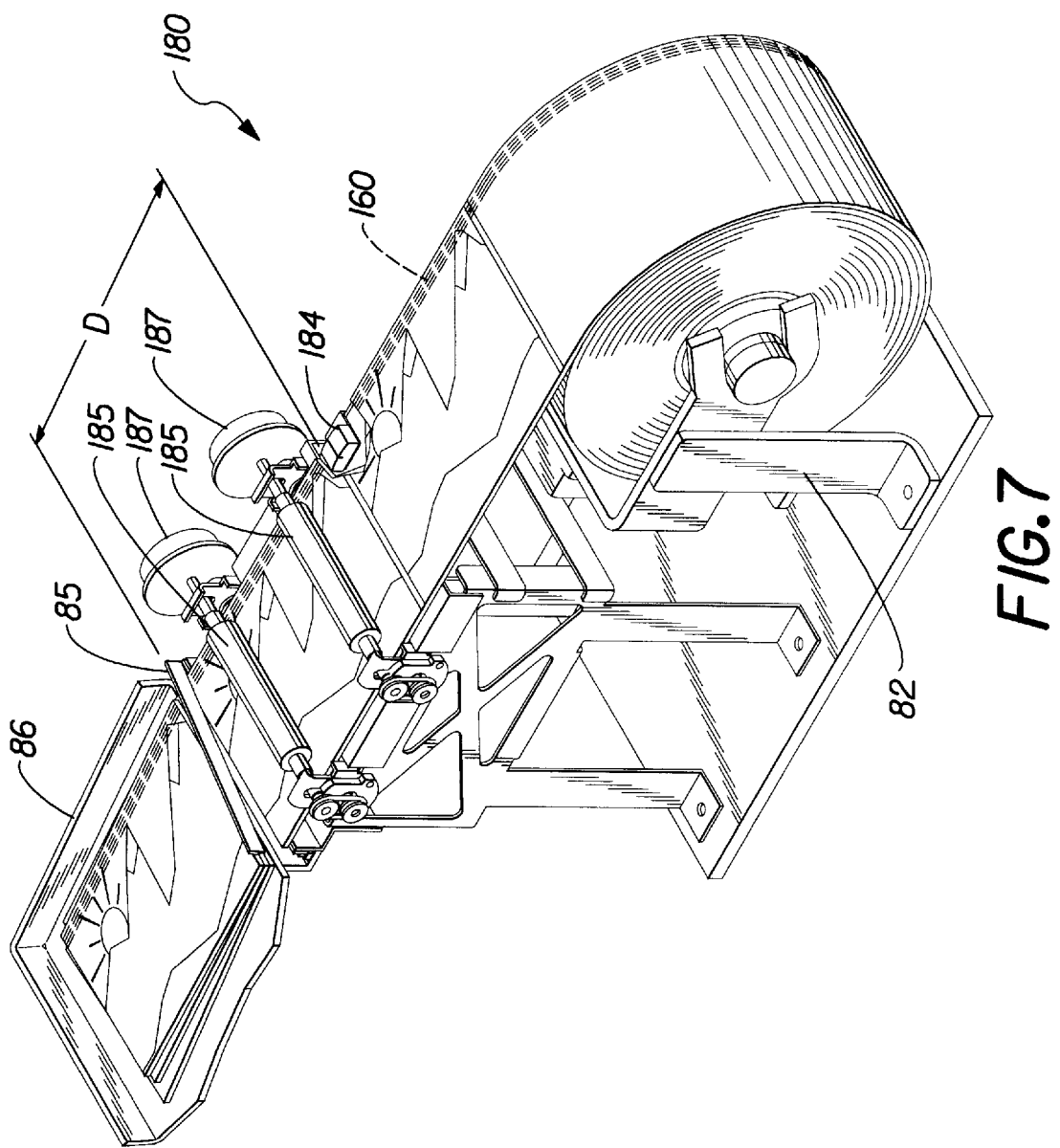
FIG. 7 is a perspective view of a cutting station in accordance with the present invention used to separate individual images of the photographic web illustrated in FIGS. 5 and 6.

Referring to FIG. 7, there is illustrated a cutting station 180 made in accordance with the present invention. Cutting station 180 is similar to cutting station 80, like numerals indicating like parts, except instead of having a perforation detector, there is provided a magnetic read head 184, which is used to read the magnetic information that has been placed on the strip 160. The magnetic read head 184 is disposed a distance D from the knife 85 such that the largest size print may be accommodated. Drive rollers 185 can be used as metering rollers for metering and transporting of the web 124 to the knife 85. For example, an appropriate stepper motor 187 may be provided for controlling and metering a predetermined amount of web so that the desired point at which cutting is to occur is done in accordance with appropriate instructions provided on the magnetic strip 160 that is read by the read head 184. The stepper motor 187 is, of course, controlled by a central processing unit CPU (not shown), which controls automatic operation of knife 85 and any other parts associated with the cutting station 180.

In addition to providing cutting and location instructions on the magnetic strip 160, read head 184 can also provide other information, for example, sorting information for sorting of customer orders. Thus, if the cutting station is provided with a plurality of holders, customers can automatically be sorted by specific customer orders further minimizing any manual manipulation by the operator at the cutting station. In addition to cutting and sorting information, various other types of information may be recorded, for example, but not by way of limitation, the exposure values used to produce the print, customer associated data/information that may have been provided on the film or added otherwise or obtained, audible sounds may be provided so that the print can be placed on the device whereby sounds obtained, for example, a vacation spot, may be provided which is in association with the image produced on the print. Thus, the providing of information on the magnetic strip 160 greatly enhances the versatility and use of a photofinishing system allowing more efficient use and with fewer human errors.

In order to more clearly understand the present invention, a discussion of its operation follows. First there is provided a printer 110 as previously discussed. Magazines 22 are provided, each having a roll of photosensitive web 124 having magnetic media 125 provided thereon. Photosensitive material 124 contained in magazine 22 is passed from supply area 26 to print area 29 in section 28 wherein images on the film are exposed onto the emulsion side of the photographic web 124. Information that has been obtained by sensors 15,17 are forwarded to the microprocessor 34 and can be used to control the printing process and also identify separate customer orders. Information regarding the position of each image printed on photographic web 124 and identification of each customer order can be written on the magnetic strip 160 by write head 138. Since the distance between the write head and the printed image is a predetermined known distance, accurate placement of this information can be provided at the desired location on web 124. Preferably, this information is placed on the back of each print. The printed pager is then wound into take-up magazine 32. After the paper is developed, as is customarily done, it is sent to the cutting station 180. Information read by read head 184 is used to control operation of knife 85 thereby separating adjacent images and also segregating customer orders. Additionally, any information written on the magnetic media 125 may be used to control various other processing equipment, for example, but not by way of limitation, the printer for reprinting the image based on the instructions provided on the magnetic media 125.

Figure 8:
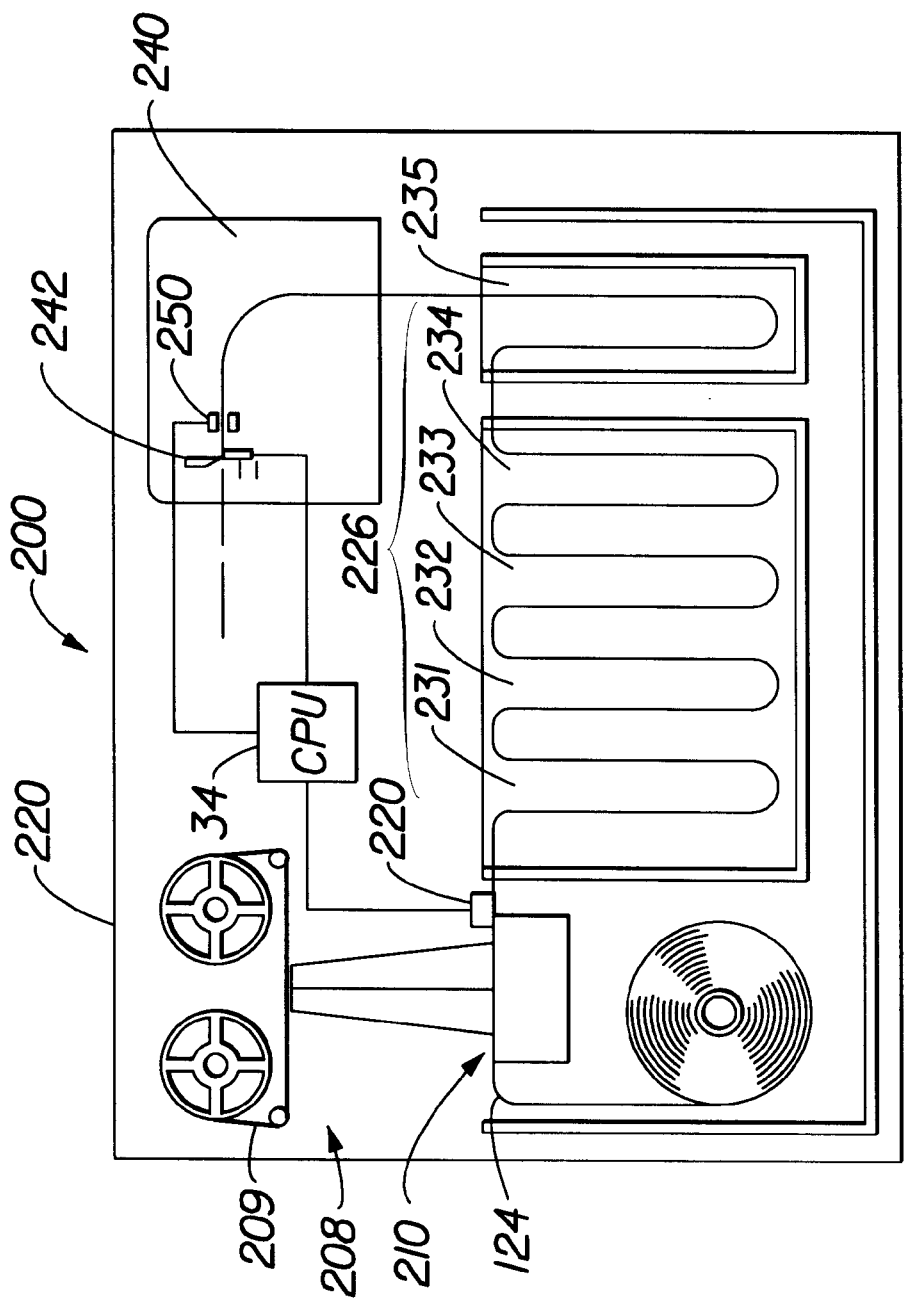
FIG. 8 is a schematic view of a photographic minilab made in accordance with the present invention used to print and process a web of photographic material.
Figure 9:
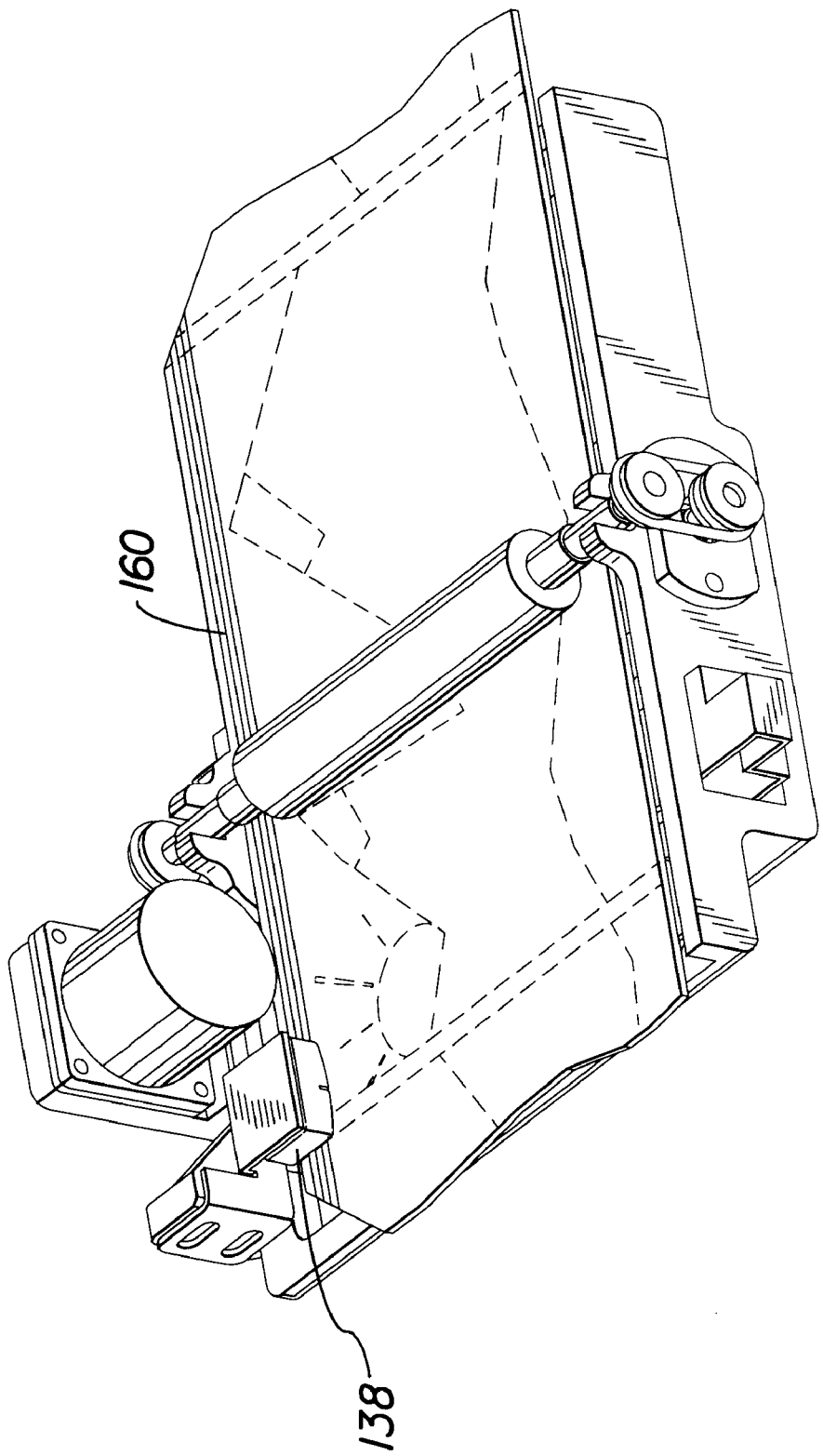
FIG. 9 is a perspective view of a portion of the minilab of FIG. 8 illustrating how information is placed onto the web of photographic material being processed.
Figure 10:
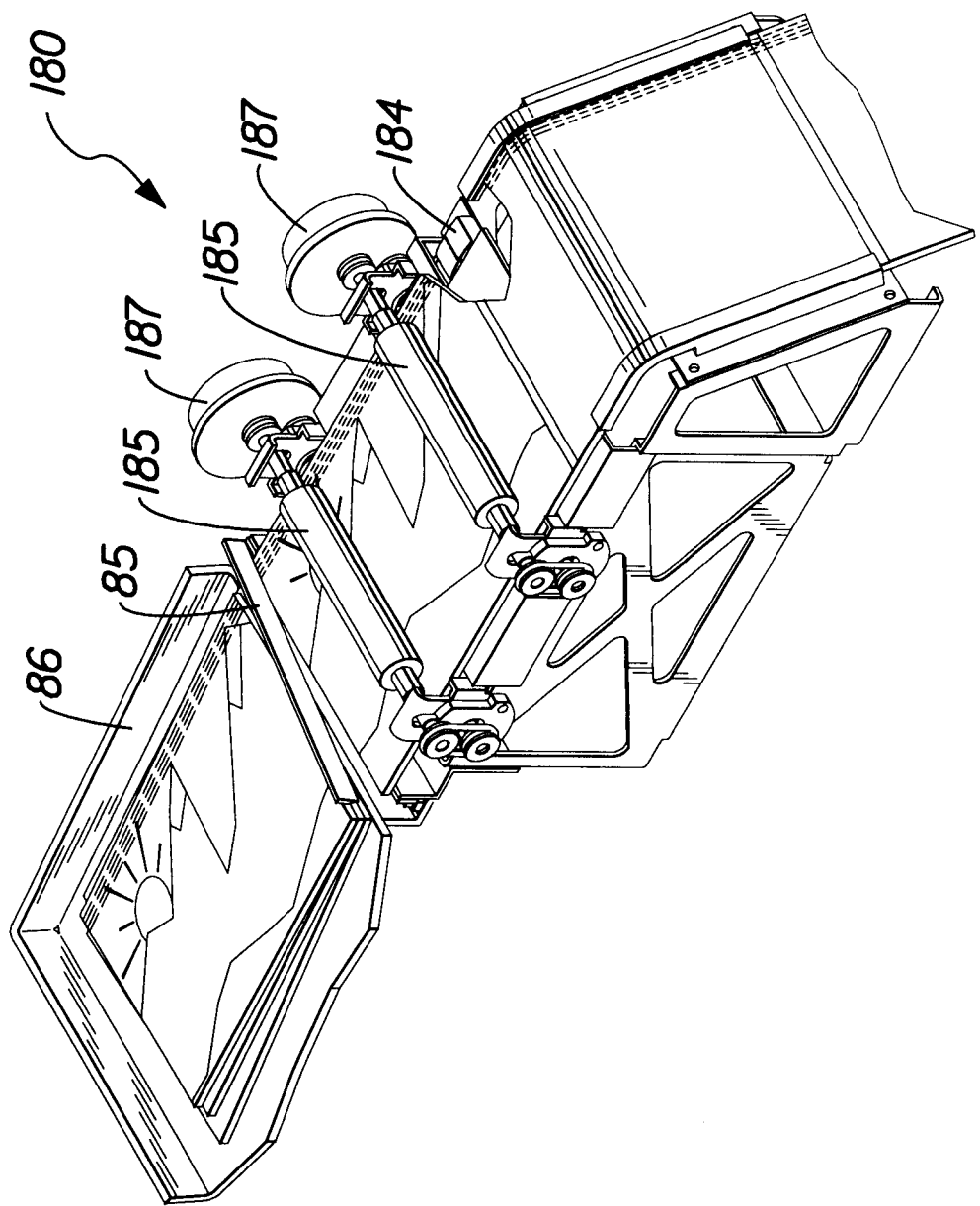
FIG. 10 is a perspective view of the cutting station of the minilab of FIGS. 8 and 9 illustrating how individual images are separated from the web of photosensitive material.

FIGS. 8–10 illustrate a modified form of the present invention. The embodiment of FIG. 8 illustrates a schematic view of a photographic minilab 200 made in accordance with the present invention. In particular, the minilab 200 includes a print station 208 whereby images on film 209 are exposed onto photographic paper 124 at exposure station 210. The minilab 200 also includes a magnetic write mechanism 220 which is similar in structure and operation to that of magnetic writing mechanism 136 previously discussed. The magnetic writing mechanism 220 provides the appropriate information on the photosensitive web 124 which is then passed through the processing section 226. The processing section 226 comprises a plurality of processing tanks 231,232,233,234 containing typical processing solutions, and a drying section 235. Thereafter, the photosensitive material 124 is passed onto the drying section 240 and past read head 250 for reading the magnetic strip 160. The information read controls knife 242 which thereby cuts the web 124 into individual sheets containing separate images in the same manner as previously discussed.

FIG. 9 illustrates a bottom view of the writing mechanism 220 which is similar to writing mechanism 136, like numerals indicating like parts and operation.

FIG. 10 illustrates the cutting station illustrated in FIG. 8 having like numerals and operation to cutting station 180, previously discussed.

It is to be understood that various other changes and modifications may be made without departing from the spirit or scope of the present invention, the present invention being limited by the following claims.

Parts List:
- 10 . . . printer
- 12 . . . supply reel
- 14 . . . negative film
- 15,17,19 . . . sensors
- 16 . . . film gate
- 18 . . . light source
- 19 . . . read head
- 20 . . . take-up reel
- 22 . . . supply magazines
- 24 . . . photosensitive material
- 26 . . . magazine supply area
- 28 . . . printing section
- 29 . . . printing area
- 32 . . . take-up magazine
- 34 . . . microprocessor
- 36 . . . perforation device
- 38,40 . . . perforation-forming heads
- 39 . . . perforations/notches
- 41,42 . . . longitudinal edges
- 44,46 . . . L-shaped support members
- 45,47 . . . end
- 48,49 . . . drive motors
- 50*a*,50*b* . . . frame members
- 51,53 . . . upper end
- 54 . . . arrows
- 55,56 . . . adjacent images
- 58 . . . arrow
- 60 . . . motor
- 62 . . . drive pulley
- 64 . . . drive belt
- 66 . . . idler pulley
- 67 . . . frame
- 68 . . . connecting member
- 70,71 . . . plate members
- 73 . . . screw
- 80 . . . cutting station
- 82 . . . frame
- 84 . . . sensor
- 85 . . . knife
- 86 . . . receiving tray
- 110 . . . printer
- 120 . . . paper processor
- 124 . . . photographic web
- 125 . . . magnetic media
- 130 . . . cutting station
- 132 . . . arrows
- 136 . . . magnetic writing mechanism
- 138 . . . write head
- 140 . . . mounting block
- 142 . . . frame
- 144 . . . belt
- 146 . . . connecting member
- 150 . . . drive pulley
- 152 . . . motor
- 154 . . . idler pulley
- 160 . . . strip
- 180 . . . cutting station
- 184 . . . magnetic read head
- 185 . . . drive rollers
- 187 . . . stepper motor
- 200 . . . photographic minilab
- 208 . . . print station
- 210 . . . exposure station
- 220 . . . magnetic write mechanism
- 226 . . . processing section
- 231,232,233,234 . . . tanks
- 235 . . . drying section
- 240 . . . drying section
- 242 . . . knife
- 250 . . . read head

I claim:

1. An apparatus for locating and cutting individual images from a web containing a plurality of images, said web having a magnetic media capable of retaining magnetically recorded data, said apparatus comprising:

a reader for reading magnetically recorded data contained on said magnetic media of said web which provides information relating to the location of the images on said web; and means responsive to the information read by said reader and for performing an operation to said web after said plurality of images have been printed on said web in accordance with said information.

2. An apparatus according to claim 1 wherein said means responsive to said information read by said reader comprises a knife for cutting individual images from said web.

3. An apparatus according to claim 2 wherein said means responsive to said information read by said reader comprises a sorter for sorting individual images cut from said web.

4. A system for processing a photosensitive web of paper containing a plurality of images, said web having a magnetic media capable of retaining magnetically recorded data, said system comprising:

a printing device for printing images on a web of photosensitive paper, said device including means for magnetically recording information on the magnetic media on said web of paper regarding said plurality of images; and a handling device having means for reading said magnetically recorded data contained on said magnetic media which provides information relating to the images printed thereon, and means for performing a handling operation on said web in accordance with said data read by said reader.

5. A system according to claim 4 wherein said means for performing an operation on said web comprises a knife for cutting individual images from said web.

6. A system according to claim 4 wherein said means responsive to said information read by said reader comprises a sorter for sorting individual images cut from said web.

7. A system according to claim 4 wherein said means for reading said information is positioned at a predetermined position with respect to said means for performing an operation on said web such that said means for performing an operation on said web can be actuated in accordance with the information.

8. A method for separating individual images from a web containing a plurality of images, the method comprising the steps of:

a) providing a web of photosensitive material having a plurality of images formed thereon, said web having a magnetic media containing information relating to the location of said individual images for allowing said individual images to be cut from said web;

b) reading said information contained on the magnetic media on said web; and c) cutting said individual images from said web in accordance with said information.

9. The method according to claim 8 further comprising the step of sorting said images in accordance with said information.

10. A method for identifying the location of individual images in a web containing a plurality of images and for separating said individual images from said web, said web containing a magnetic storage media, comprising the steps of:

a) providing a plurality of images on a photosensitive web, said web containing a magnetic storage media capable of retaining informational data;

b) providing informational data on said magnetic media which relates to the location and placement of said individual images on said web;

c) reading said informational data from said magnetic media and determining the location of said images using said informational data; and d) cutting said individual images in accordance with said informational data.

11. The method according to claim 10 further comprising the step of sorting said images in accordance with said informational data.

12. A photographic printer for printing images onto a photosensitive material, said printer comprising:

means for providing a plurality of images on a photosensitive web, said web having a magnetic media capable of retaining magnetically recorded data;

means for applying informational data on a said magnetic media which provides information relating to the location of said images on said web;

a reader for reading said informational data provided on said magnetic media; and a knife for cutting individual images from said web in accordance with said informational data read by said reader.

13. A printer according to claim 12 wherein said reader for reading informational data is disposed at a predetermined position with respect to where said images are placed on said web.

14. A printer according to claim 12 wherein said reader for reading said informational data is positioned at a predetermined position with respect to said knife such that said knife can be actuated in accordance with the informational data read by said reader.

15. A printer according to claim 12 wherein said informational data is also used to provide instructions for handling of the individual images.

16. A printer according to claim 15 wherein said informational data comprises information relating to the sorting of individual prints in accordance with a preselected criteria.

17. A printer according to claim 12 further comprising a processing section for developing the images placed on said photosensitive web.

18. A printer according to claim 12 wherein said photosensitive web comprises photosensitive paper.

* * * * *